US007143165B2

(12) United States Patent
Vogel et al.

(10) Patent No.: US 7,143,165 B2
(45) Date of Patent: *Nov. 28, 2006

(54) UPDATING TRUSTED ROOT CERTIFICATES ON A CLIENT COMPUTER

(75) Inventors: Keith R. Vogel, Duvall, WA (US); Charlie D. Chase, Woodinville, WA (US); Kelvin S. Yiu, Seattle, WA (US); Philip J. Hallin, Port Townsend, WA (US); Louis K. Thomas, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 85 days.

This patent is subject to a terminal disclaimer.

(21) Appl. No.: 10/967,608

(22) Filed: Oct. 18, 2004

(65) Prior Publication Data

US 2005/0080899 A1 Apr. 14, 2005

Related U.S. Application Data (63) Continuation of application No. 09/542,669, filed on Apr. 4, 2000, now Pat. No. 6,816,900.

(60) Provisional application No. 60/174,420, filed on Jan. 4, 2000.

(51) Int. Cl.
*G06F 15/173* (2006.01)

(52) U.S. Cl. ............... 709/225; 709/203; 709/217; 709/227; 709/229; 713/156; 713/169; 713/175

(58) Field of Classification Search ........ 709/202–203, 709/217–219, 225–229; 713/155–159, 168–169, 713/172, 175, 200–201
See application file for complete search history.

(56) References Cited

U.S. PATENT DOCUMENTS

| 5,621,797 A | 4/1997 | Rosen |
| 5,717,757 A | 2/1998 | Micali |
| 5,949,877 A | 9/1999 | Traw |
| 6,058,484 A | 5/2000 | Chapman |
| 6,094,485 A | 7/2000 | Weinstein et al. |
| 6,128,740 A | 10/2000 | Curry et al. |
| 6,134,550 A | 10/2000 | Van Oorschot et al. |

(Continued)

OTHER PUBLICATIONS

Housley et al., "Internet X.509 Public Key Infrastructure Certified and CRL Profile," Standards Track, Jan. 1999, pp. 1-129.

(Continued)

*Primary Examiner*—Bharat Barot
(74) *Attorney, Agent, or Firm*—Lee & Hayes, PLLC (57) ABSTRACT

An update process is used to update root certificates in a root certificate store of a client computer, maintaining the integrity of the existing root certificates as well as any new root certificates. In accordance with certain aspects, the integrity of a certificate trust list identifying one or more root certificates is verified. The root certificate store of the client computer is modified in accordance with the certificate trust list if the integrity of the certificate trust list is verified.

37 Claims, 5 Drawing Sheets

U.S. PATENT DOCUMENTS

| | | |
|---|---|---|
| 6,134,551 A | 10/2000 | Aucsmith |
| 6,226,743 B1* | 5/2001 | Naor et al. .................. 713/157 |
| 6,301,658 B1* | 10/2001 | Koehler ...................... 713/155 |
| 6,301,659 B1 | 10/2001 | Micali |
| 6,308,277 B1 | 10/2001 | Vaeth et al. |
| 6,367,013 B1 | 4/2002 | Bisbee et al. |
| 6,370,249 B1 | 4/2002 | Van Oorschot |
| 6,421,781 B1 | 7/2002 | Fox |
| 6,430,688 B1 | 8/2002 | Kohl et al. |
| 6,438,550 B1 | 8/2002 | Doyle et al. |
| 6,442,688 B1 | 8/2002 | Moses |
| 6,463,534 B1 | 10/2002 | Geiger et al. |
| 6,487,658 B1* | 11/2002 | Micali ........................ 713/158 |
| 6,513,116 B1 | 1/2003 | Valente |
| 6,636,975 B1 | 10/2003 | Khidekel et al. |
| 6,671,803 B1 | 12/2003 | Pasieka |
| 6,816,900 B1* | 11/2004 | Vogel et al. ................. 709/225 |
| 2001/0016877 A1 | 8/2001 | Dancs et al. |
| 2002/0152382 A1 | 10/2002 | Xiao |

OTHER PUBLICATIONS

"PKCS #7: Cryptographic Message Syntax Standard," An RSA Laboratories Technical Note, Version 1.5, Revised Nov. 1, 1993, pp. 1-30, (RSA ata Security Inc. Public-Key Cryptography Standars (PKCS)).

"The AIS Login Mechanism" web pages—CERN—European Laboratory for Particle Physics Administrative Information Services, printed Feb. 15, 2000, 5 pages.

* cited by examiner

UPDATING TRUSTED ROOT CERTIFICATES ON A CLIENT COMPUTER

RELATED APPLICATIONS

This application is a continuation of U.S. patent application Ser. No. 09/542,669, filed Apr. 4, 2000, entitled "Updating Trusted Root Certificates On A Client Computer" to Keith R. Vogel, Charlie D. Chase, Kelvin S. Yiu, Philip J. Hallin, and Louis K. Thomas, now U.S. Pat. No. 6,816,900 which claims the benefit of U.S. Provisional Application No. 60/174,420, filed Jan. 4, 2000, entitled "Updating Trusted Roots" to Keith R. Vogel, Charlie D. Chase, Kelvin S. Yiu, and Philip J. Hallin.

TECHNICAL FIELD

This invention relates to supporting secure network connections, and more particularly to updating trusted root certificates on a client computer.

BACKGROUND OF THE INVENTION

Computer technology is continually advancing, resulting in continually evolving uses for computers. One such use is communicating with other computers over a network, such as the Internet, to obtain or exchange information, purchase or sell goods or services, etc. To assist in such communication, the Internet supports the "World Wide Web", which is a collection of facilities that links together documents (each referred to as a "web page"). Web pages can be located on the same server or distributed among multiple servers worldwide.

The uses for the Internet and the World Wide Web are continually increasing, and have expanded into "secure" areas. Maintaining security in a large public network such as the Internet can be a difficult task. Different mechanisms for maintaining security have been developed, such as the Secure Sockets Layer (SSL) security protocol. The SSL protocol uses a public key infrastructure to maintain security. In establishing an SSL connection between a client computer and a server computer hosting a web page, the server computer transmits a certificate to the client computer for verification. If a trusted certifying authority has approved the server computer (or web page) for secure connections, then a root certificate that is maintained at the client and issued by a root certifying authority (CA) will verify the certificate received from the server.

Currently, many different certifying authorities exist and new certifying authorities are continually being established. The root certificates maintained at the client computer are typically included as part of an application, such as a web browser (which allows a user to access web pages) or an operating system. Problems arise with the use of root certificates because new certifying authorities are being established that would like to include new root certificates at the client computers, or existing certifying authorities may want to add new root certificates, after the application has been distributed to consumers. However, adding new root certificates to an application that has already been distributed to consumers can be a difficult and cumbersome process.

One solution to this problem is to re-distribute the application including the root certificates (e.g., a web browser or operating system) each time a new root certificate is to be added. However, this is cumbersome on both the application developer and distributors as well as the consumer because new versions would have to be continually distributed (e.g., changes in root certificates could occur as frequently as weekly or daily), and the consumer would be required to install each new version of the application. Such continual installation is burdensome on the consumer, particularly since the consumer may not actually use the new certificates.

Another solution to this problem is to require the user to manually install new root certificates. However, this solution is also burdensome on the consumer because the consumer is required to know that he or she needs a new certificate, as well as how to obtain such a certificate, verify the integrity of the certificate, and proceed with manually adding the certificate to his or her computer. Such manual installation is unlikely to be attempted, much less successful, by anyone except the most experienced users.

Thus, it would be beneficial to provide a more user-friendly way in which root certificates at a client computer can be updated. The updating of trusted root certificates on a client computer described below addresses these disadvantages, providing a more user-friendly approach to updating root certificates.

SUMMARY OF THE INVENTION

Updating trusted root certificates on a client computer is described herein. An update process is used to update the root certificates on the client computer, allowing the integrity of existing root certificates as well as any new root certificates to be maintained.

According to one aspect of the invention, a root certificate store on the client computer is updated by adding trusted root certificates to the store, removing root certificates from the store, or modifying usage restrictions of root certificates in the store. A cryptographically signed message including a certificate trust list, as well as any new root certificates to be added to the store, is accessed by an update root control to update the root certificates in the store. The certificate trust list includes a subject usage indication indicating that the certificates identified by the list are root certificates, and a set of one or more hash values that correspond to the root certificates being updated. The certificate trust list may also optionally include one or more hash attributes corresponding to the hash values. These hash attributes can indicate whether the root certificate corresponding to the hash value is to be added to the store, removed from the store, or what modifications are to be made to the root certificate in the store.

According to another aspect of the invention, during the update process the update root control obtains the cryptographically signed message and a signer certificate from the signer of the message. The control verifies the integrity of the message, and thus the integrity of the certificate trust list contained therein, by establishing a certificate chain from the signer certificate to a root certificate in the client's root certificate store. Once such integrity is verified, the update root control proceeds to update the root certificate store in accordance with the information in the certificate trust list. The update root control can further use the hash values in the certificate trust list to verify the integrity of root certificates in the signed message, as well as verify which root certificates in the root certificate store are to be removed or modified.

According to another aspect of the invention, root certificates in the client's root certificate store are updated when a World Wide Web web page is accessed by the client. A check is made during the access as to whether the client's root certificate store should be updated (e.g., a new root certificate is needed in order to access the web page). If the store should be updated, then the client is redirected to another web page that hosts the update root control. The update root control executes to update the client's certificate store, and then redirects the client back to the originally requested web page.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

The discussion herein assumes that the reader is familiar with cryptography. For a basic introduction of cryptography, the reader is directed to a text written by Bruce Schneier and entitled "Applied Cryptography: Protocols, Algorithms, and Source Code in C," published by John Wiley & Sons with copyright 1994 (or second edition with copyright 1996).

In the discussion below, embodiments of the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that various embodiments of the invention may be practiced with other computer system configurations, including hand-held devices, gaming consoles, multiprocessor systems, microprocessor-based or programmable consumer electronics, network PCs, minicomputers, mainframe computers, and the like. In a distributed computer environment, program modules may be located in both local and remote memory storage devices.

Alternatively, embodiments of the invention can be implemented in hardware or a combination of hardware, software, and/or firmware. For example, all or part of the invention can be implemented in one or more application specific integrated circuits (ASICs).

Figure 1:
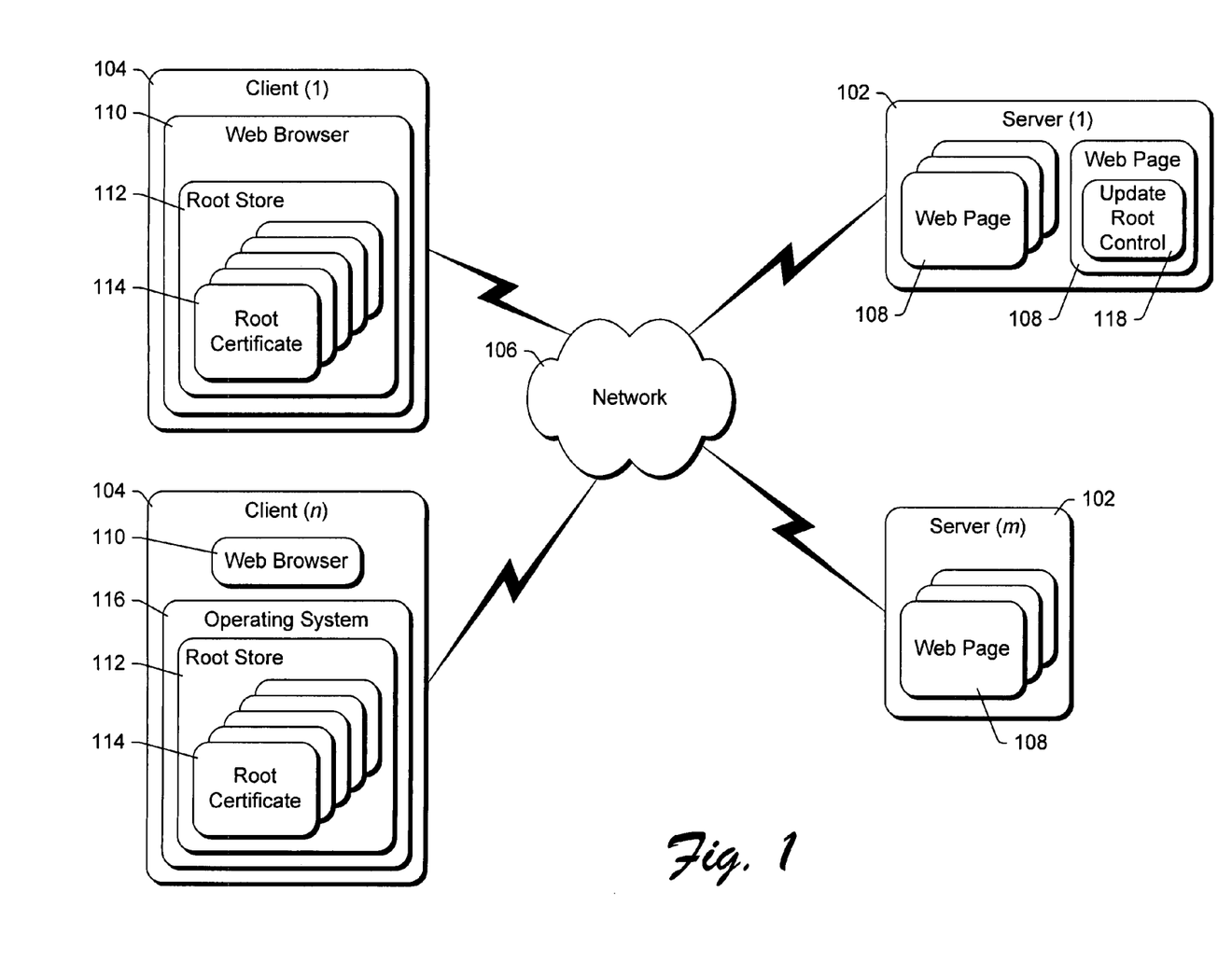
FIG. 1 shows a client/server network system and environment in accordance with one embodiment of the invention.

FIG. 1 shows a client/server network system and environment in accordance with one embodiment of the invention. Generally, the system includes multiple (m) network server computers 102, and multiple (n) network client computers 104. The computers communicate with each other over a data communications network 106. The communications network in FIG. 1 comprises a public network such as the Internet. Portions or all of data communications network 106 might also include local-area networks and private wide-area networks.

Each network server computer 102 hosts one or more World Wide Web web pages 108 that can be accessed by a web browser 110 or other application executing at a client computer 104. For ease of explanation, web browser 110 will be described as accessing web pages 108. However, those skilled in the art will appreciate that other applications executing on client computer 104 could analogously access web pages 108. Web browser 110 can establish a secure connection with one of server computers 102 using a secure communications protocol which relies on the existence of a trusted root certificate at client computer 104, such as SSL.

Each client computer 104 also maintains a root store 112 that includes one or more trusted root certificates 114 (also referred to as simply "roots"). Root store 112 can be implemented, for example, as part of web browser 110 or part of an operating system 116 or some other application (not shown) executing on client 104. To establish a secure connection between a client computer 104 and a server computer 102, server computer 102 transmits a server certificate to the client computer 104. Client computer 104 uses the server certificate to verify that server computer 102 can be trusted. In order to be trusted, the server certificate must be cryptographically signed (directly or indirectly) by a trusted certifying authority having a trusted root certificate in root store 112.

Client computer 104 maintains a root certificate 114 for each certifying authority that client computer 104 trusts. Each root certificate 114 is a self-signed certificate that is implicitly trusted by client computer 104. Upon receipt of the server certificate, client computer 104 attempts to establish a "chain" of certificates from the server certificate up to one of the trusted root certificates 114. This chain may include one or more "intermediate" certificates. Each certificate in the chain will have a "parent" certificate that can cryptographically verify the authenticity of the certificate. Eventually, the chain leads back to a parent certificate that is one of the trusted root certificates 114. If such a certificate chain can be established by client computer 104, then the server computer 102 which transmitted the server certificate is verified as being trusted and a secure connection to the server computer can be established. However, if such a certificate chain cannot be established, then the server computer is not trusted and a secure connection to the server computer cannot be established.

Root store 112 is part of a software application (e.g., web browser 110 or an operating system). Root certificates 114 are established in root store 112 during development of the application. Additionally, as discussed in more detail below, additional root certificates 114 can be automatically added to root store 112 after the application has been developed, deployed and installed on client computers 104.

Each root certificate 114 may optionally include one or more usage parameters. These usage parameters are used to limit the manner in which the root certificate can be used. For example, a particular root certificate may have its usage limited to only verifying electronic mail (email) messages. Thus, that particular root certificate could not be used as a trusted root certificate in a certificate chain for establishing a secure connection to server computer 102. In the illustrated example, the usage parameters are denoted by properties, policy extensions, and/or an enhance key usage (EKU) extension that are part of, or alternatively associated with, the certificate.

One or more of web pages 108 may also include an update root control 118. If a web page 108 is accessed by web browser 110 of client computer 102 the browser may be redirected to another web page 108 (hosted on the same or different server 102) that includes update root control 118. Browser 110 may be redirected for a variety of different reasons, such as failure to establish a secure connection with server 102 because client computer 104 could not establish a certificate chain to a trusted root certificate 114, a desire by the web page author to modify usage parameters of a root certificate 114, a desire by the web page author to delete a root certificate 114 from root store 112, etc. Alternatively, update root control 118 may be included as part of the web page initially accessed by browser 110, thereby avoiding the re-direction to another web page. The updating of root certificates on client computer 102 and the use of update root control 118 are described in more detail below.

Figure 2:
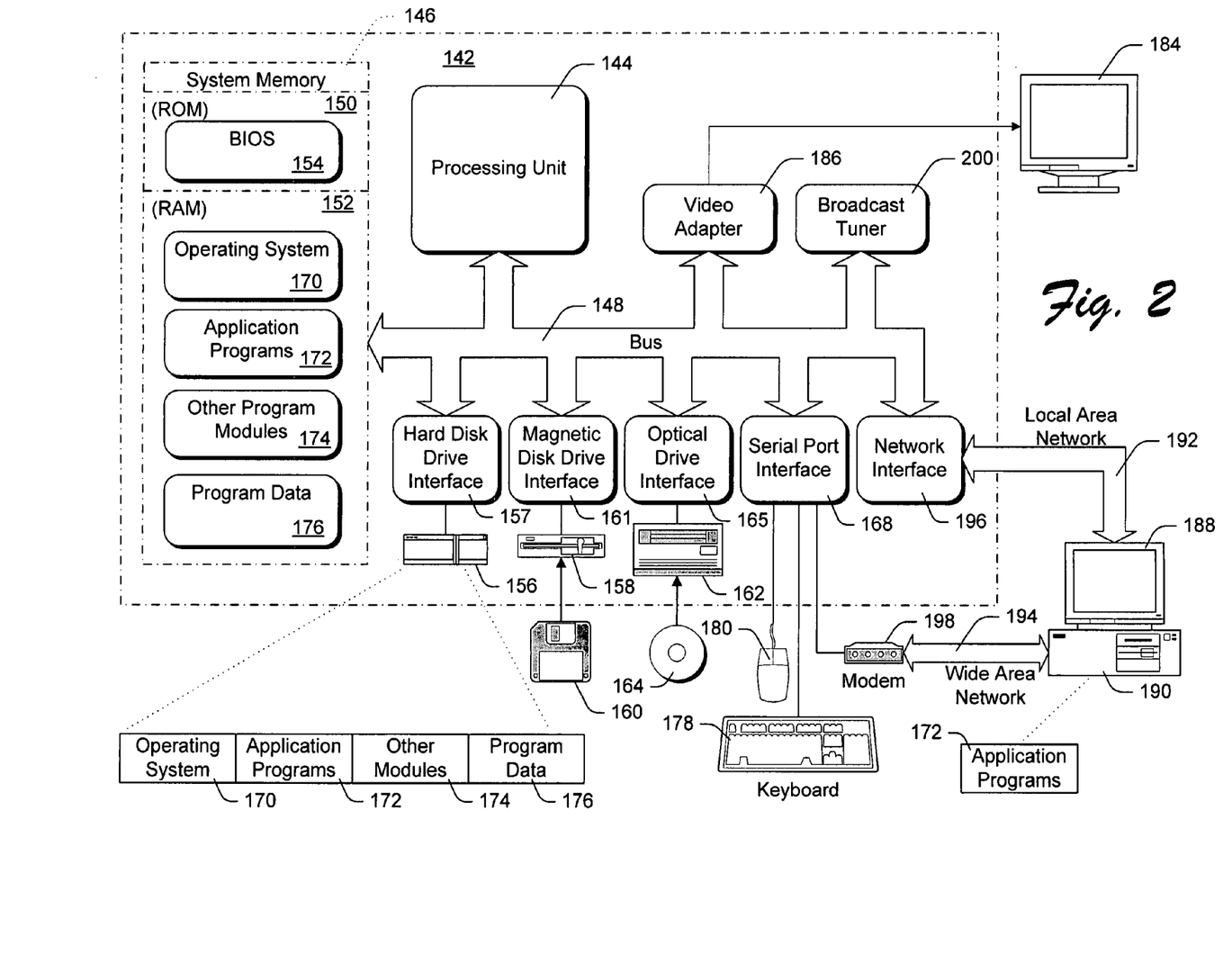
FIG. 2 shows a general example of a computer that can be used in accordance with one embodiment of the invention.

FIG. 2 shows a general example of a computer 142 that can be used in accordance with one embodiment of the invention. Computer 142 is shown as an example of a computer that can perform the functions of a client computer 104 or a server computer 102 of FIG. 1. Computer 142 includes one or more processors or processing units 144, a system memory 146, and a bus 148 that couples various system components including the system memory 146 to processors 144.

The bus 148 represents one or more of any of several types of bus structures, including a memory bus or memory controller, a peripheral bus, an accelerated graphics port, and a processor or local bus using any of a variety of bus architectures. The system memory includes read only memory (ROM) 150 and random access memory (RAM) 152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk, not shown, connected to bus 148 via a hard disk driver interface 157 (e.g., a SCSI, ATA, or other type of interface); a magnetic disk drive 158 for reading from and writing to a removable magnetic disk 160, connected to bus 148 via a magnetic disk drive interface 161; and an optical disk drive 162 for reading from or writing to a removable optical disk 164 such as a CD ROM, DVD, or other optical media, connected to bus 148 via an optical drive interface 165. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. Operating system 170 can be any of a variety of operating systems, such as any of the "Windows" family of operating systems available from Microsoft Corporation of Redmond, Wash. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 168 (e.g., a serial port interface) that is coupled to the system bus. A monitor 184 or other type of display device is also connected to the system bus 148 via an interface, such as a video adapter 186. In addition to the monitor, personal computers typically include other peripheral output devices (not shown) such as speakers and printers.

Computer 142 can optionally operate in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other means for establishing communications over the wide area network 194, such as the Internet. The modem 198, which may be internal or external, is connected to the system bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Computer 142 can also optionally include one or more broadcast tuners 200. Broadcast tuner 200 receives broadcast signals either directly (e.g., analog or digital cable transmissions fed directly into tuner 200) or via a reception device (e.g., via an antenna or satellite dish (not shown)).

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Returning to FIG. 1, update root control 118 can update the root store 112 in a client computer 104. This updating can include adding new root certificates 114 to root store 112, deleting root certificates 114 from root store 112, and modifying usage restrictions of root certificates 114. In order to update the root store 112 the root certificates to be updated, along with what type of updating is to take place, are identified in a message that is cryptographically signed by a trusted party. This trusted party can be, for example, the author and/or manufacturer of the application containing root store 112 (e.g., the author of the web browser 110 or operating system 116).

In the illustrated example, root control 118 is an ActiveX control that is hosted on a web page maintained at a network server 102 of FIG. 1. When the web page is accessed, root control 118 is copied to and executed by client computer 104. Alternatively, root control 118 can be implemented in different manners, such as another type of control rather than an ActiveX control, as an application or control executing on network server 102, as code resident on client computer 104, etc.

Figure 3:
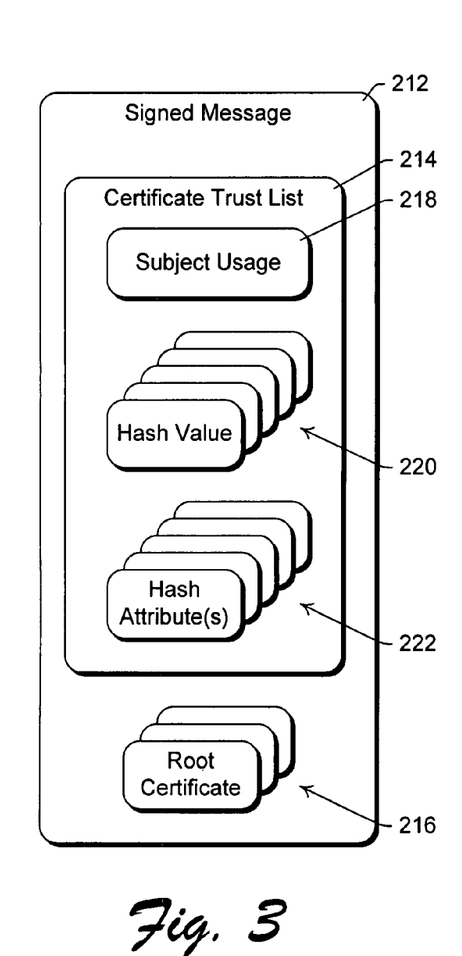
FIG. 3 is a block diagram illustrating an exemplary cryptographically signed message for updating root certificates in accordance with one embodiment of the invention.

FIG. 3 is a block diagram illustrating an exemplary cryptographically signed message for updating root certificates in accordance with one embodiment of the invention. A cryptographically signed message 212 includes a certificate trust list (CTL) 214 and optionally one or more corresponding root certificates 216. A CTL generally is a list of subjects trusted for different purposes, and in the illustrated example includes a list of trusted root certificates. Additional information regarding exemplary CTL structures can be found in the Microsoft Developer Network (MSDN) Library, available from Microsoft Corporation of Redmond, Wash.

Signed message 212 includes a new root certificate 216 for each new root certificate that is to be added to root store 112 of a client computer 104 of FIG. 1. If a root certificate is to be removed from root store 112, or the usage restrictions of a root certificate are to be changed, then the root certificate may optionally be excluded from message 212.

In one embodiment, signed message 212 is a cryptographically signed message in accordance with the Public-Key Cryptography Standards (PKCS) #7 standard. Additional information regarding PKCS #7 is available from RSA Data Security, Inc. of Bedford, Mass. Alternatively, other types of cryptographically signed messages can be used.

Certificate trust list 214 includes a subject usage indication 218, one or more hash values 220, and optionally one or more hash attributes 222. Subject usage indication 218 indicates the default usage restrictions for the root certificates in certificate trust list 214. For example, subject usage indication 218 may contain client authentication and server authentication usage restrictions. A hash value 220 is included for each root certificate that is to be updated. The hash value 220 is generated using any of a wide variety of conventional one-way functions, such as the Secure Hash Algorithm-1 (SHA-1). A one-way hash function is a mathematical function that, given input data (e.g., a root certificate), generates an output hash value. The one-way hash function is chosen such that it is conjectured to be infeasible, knowing the one-way hash function and given a particular hash value, to find the input data that produces the particular hash value. The one-way hash function being used is made publicly known, allowing the input data to be verified given the hash value.

The hash value 220 allows update root control 118 of FIG. 1 to verify that a root certificate 216 to be added to root store 112 has not been altered since being signed. Control 118, when adding a root certificate 216 to root store 112, can apply the same one-way function to root certificate 216 as was applied to generate the corresponding hash value 220. If the root certificate 216 has not been altered, then the hash value generated by control 118 is the same as hash value 220. However, if the hash value generated by control 118 is not the same as hash value 220, then control 118 knows that the root certificate 216 has been altered and control 118 will not add the certificate to root store 112.

Similarly, the hash value 220 allows update root control 118 to verify which certificate in root store 112 is to be removed or modified (e.g., its usage restrictions changed). Control 118 generates hash values for the root certificates 114 in root store 112 and compares the generated hash values to the hash value 220. When a match is found, control 118 removes or modifies the corresponding root certificate 114 based on hash attribute(s) 222, as discussed in more detail below.

Certificate trust list 214 may optionally include one or more hash attributes 222 corresponding to each hash value 220. These hash attributes are extensions to the certificate trust list 214 that identify whether the corresponding root certificate is to be added to or deleted from root store 112 of a client computer 104 of FIG. 1, or whether the usage restrictions of the corresponding root certificate are to be modified, and if so how they are to be modified.

In one embodiment, update root control 118 performs the same operation for all of the root certificates identified in message 212. For example, all of the root certificates identified in message 212 are added to root store 112, all of the root certificates identified in message 212 are deleted from root store 112, the usage restrictions of all of the root certificates identified in message 212 are modified in the same manner, etc. Alternatively, different operations may be performed for different root certificates as indicated by the corresponding hash attributes 222.

Message 212 is cryptographically signed by a trusted party, which is typically the author and/or manufacturer of the application that includes root store 112. Message 212 can be cryptographically signed in any of a wide variety of conventional manners. In one implementation, the trusted party that signs message 212 has a public key/private key pair (e.g., in accordance with either of the well-known Rivest-Shamir-Adleman (RSA) or Elliptic Curve Cryptography (ECC) encryption schemes). The private key is kept secret by the trusted party while the public key is made available to anyone wishing to verify signatures from the trusted party. The public key is typically made available as a certificate (referred to herein as the signer's certificate).

A message can be cryptographically signed by the trusted party by applying a conventional hash algorithm along with the private key to message 212 to generate a digital signature. This digital signature is forwarded to the intended recipient along with message 212. The digital signature can then be verified by the recipient applying the known hash function to the received message 212 and comparing this generated hash value to the decrypted digital signature. If the two hash values match, then the recipient is ensured that the trusted party did in fact sign message 212 and that message 212 has been unaltered since it was signed.

Update root control 118 of FIG. 1 further verifies the integrity of certificate trust list 214 by verifying that the party signing message 212 is in fact the party it claims to be (and a party to be trusted by client 104). A signer certificate corresponding to the party signing message 212 is made available to control 118 (e.g., the signer certificate may accompany message 212). This signer certificate includes a public key which can be used by control 116 in a conventional manner to verify that the party did in fact sign message 212. The verification process performed by control 118 is referred to as generating a "certificate chain" or "certificate path" from the signer certificate back up to a trusted root certificate 114 on client 104. In one implementation, the certificate chain is generated using the Cryptographic Application Programming Interface (CryptoAPI), available from Microsoft Corporation of Redmond, Wash.

In one embodiment, an Application Programming Interface (API) is used to verify that a certificate trust list is a signed list of root certificates. This API is defined as follows:

```
I_CertVerifySignedListOfTrustedRoots(
    IN const BYTE          *pbCtlEncoded,
    IN DWORD               cbCtlEncoded,
    OUT BOOL               *pfRemoveRoots,
    OUT HCERTSTORE         *phRootListStore,
    OUT PCCERT_CONTEXT     *ppSignerCert
);
```

For a successfully verified CTL: (1) TRUE is returned; (2) *pfRemoveRoots is set to FALSE to add roots and is set to TRUE to remove roots; (3)*phRootListStore is a certificate store containing only the roots to add or remove. *phRootListStore should be closed by calling CertCloseStore( ). For added roots, the CTL's SubjectUsage field is set as CERT_ENHKEY_USAGE_PROP_ID on all of the certificates in the store; (4) *ppSignercert is a pointer to the certificate context of the signer. *ppSignerCert should be freed by calling CertFreeCertificateContext( ).

For a CTL that is not verified, FALSE is returned with *phRootListStore and *ppSignerCert set to NULL.

Figure 4:
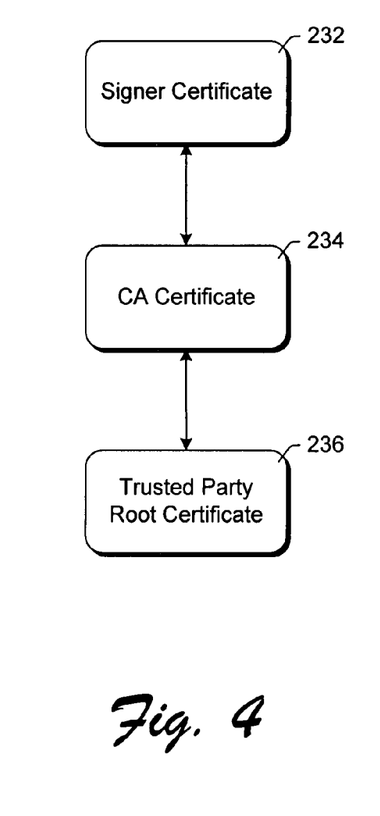
FIG. 4 is a block diagram illustrating an exemplary certificate chain in accordance with one embodiment of the invention.

FIG. 4 is a block diagram illustrating an exemplary certificate chain in accordance with one embodiment of the invention. A signer certificate 232 is claimed to be from a trusted party. Signer certificate 232 indicates that it has a parent certificate which is certifying authority (CA) certificate 234. CA certificate 234 is an intermediate certificate which is issued by a CA (not shown) and which cryptographically signs signer certificate 232. Thus, if the CA is trusted and the CA certificate 234 can be verified as being from the CA, then the signer certificate 232 can be verified as being from the trusted party.

CA certificate 234 indicates that it has a parent certificate which is trusted party root certificate 236 (alternatively, there may be additional intermediate certificates between CA certificate 234 and root certificate 236). Trusted party root certificate 236 is one of root certificates 114 in root store 112 of client 104 of FIG. 1. Trusted party root certificate 236 is installed on client 104 by the trusted party, as discussed above. The trusted party signs itself as well as the CA certificate 234. Thus, trusted party root certificate 236 is trusted as it is installed in root store 112. Similarly, trusted party root certificate 236 is used to verify CA certificate 234.

Thus, a chain is established from signer certificate 232 up to a root certificate in root store 112, thereby allowing update root control 118 to verify the integrity of signed message 212 of FIG. 3.

Figure 5:
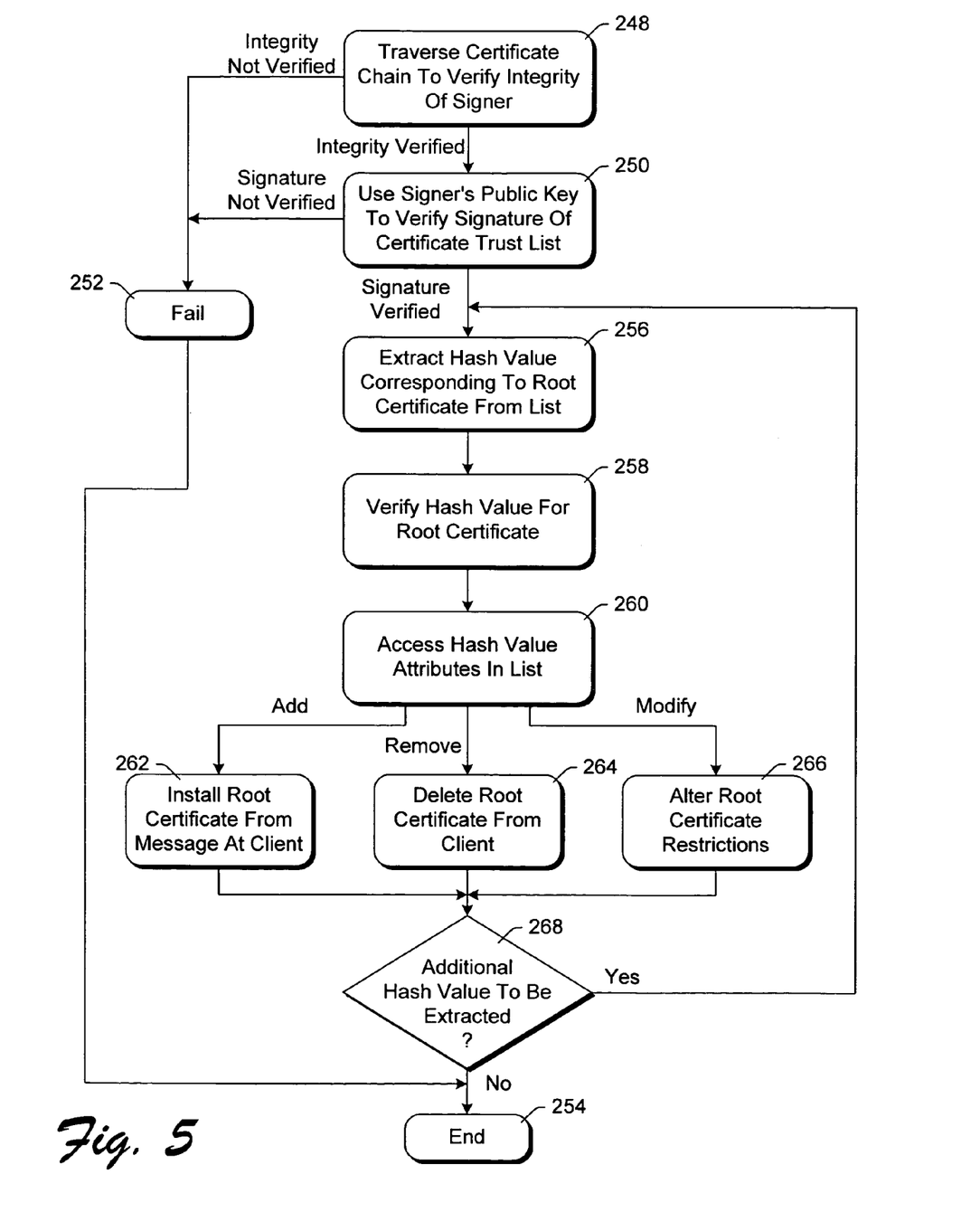
FIG. 5 is a flowchart illustrating an exemplary process for updating root certificates in accordance with one embodiment of the invention.

FIG. 5 is a flowchart illustrating an exemplary process for updating root certificates in accordance with one embodiment of the invention. The process of FIG. 5 is implemented by update root control 118 of FIG. 1, and may be performed in software. FIG. 5 is described with additional reference to components in FIGS. 1 and 3.

Initially, update root control 118 traverses a certificate chain to verify the integrity of the signer of a certificate trust list (act 248). Next, it extracts the public key from the signer certificate to verify the signature of the certificate trust list (act 250). If the integrity of the signer or the signature of the certificate trust list cannot be verified, then the updating process fails (act 252) and ends (act 254). However, if the integrity of the signer and the signature of the certificate list are verified, then a hash value corresponding to a root certificate is extracted from the certificate trust list (act 256).

Control 118 then verifies the hash value for the root certificate (act 258), thereby verifying which root certificate is to be updated and, in the case of adding a root certificate, that the root certificate has not been altered. Control 118 then accesses the certificate attributes in the certificate trust list (act 260) to determine what type of updating should be performed for the root certificate. In the illustrated example, the updating includes one of adding a root certificate, removing a root certificate, or modifying a root certificate.

If a new root certificate is to be added to the root store, then the root certificate included in the same message as the certificate trust list that corresponds to the hash value extracted in act 256 is installed at the client computer 104 (act 262). The root certificate is installed by copying the root certificate from the message to root store 112 of client computer 104.

If a root certificate is to be removed from the root store, then the root certificate in root store 112 corresponding to the hash value extracted in act 256 is identified and deleted from root store 112 (act 264). Alternatively, rather than deleting the root certificate from root store 112, the root certificate may be left in root store 112 but labeled as "expired" or "invalid".

If a root certificate is to be modified, then the root certificate in root store 112 corresponding to the hash value extracted in act 256 is identified and its restrictions altered in accordance with the hash value attributes in the certificate trust list (act 266). This alteration can include adding restrictions, removing restrictions, replacing restrictions, etc. Note that this alteration is performed based on the hash value attributes 222—the root certificates 216 are digitally signed and thus cannot be altered to include such attributes.

Regardless of what type of updating is performed, when the updating is completed update control 118 checks whether there are additional hash values to be extracted from the list (act 268). If there are additional hash values to be extracted, then control 118 returns to act 256 to extract another hash value. However, if there are no additional hash values to be extracted, then the updating process ends (act 254).

Figure 6:
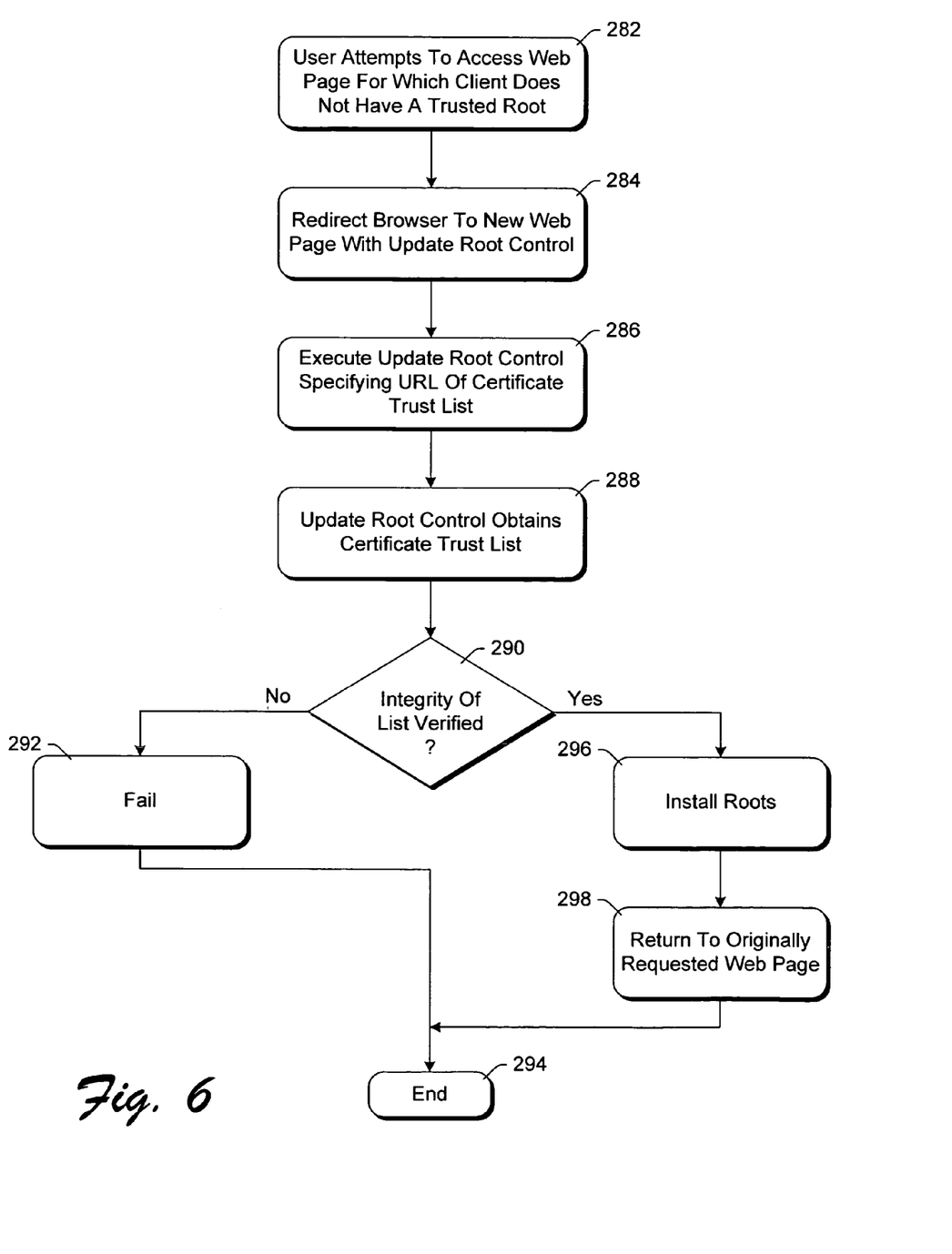
FIG. 6 is a flowchart illustrating an exemplary process for automatically updating root certificates via a network in accordance with one embodiment of the invention.

FIG. 6 is a flowchart illustrating an exemplary process for automatically updating root certificates via a network in accordance with one embodiment of the invention. The process of FIG. 6 is implemented in part by update root control 118 of FIG. 1, and may be performed in software. FIG. 6 is described with additional reference to components in FIG. 1.

Initially, a user attempts to access a web page which requires a trusted root certificate that the client computer does not have (act 282). This requested web page redirects the client web browser 110 to a new web page that hosts update root control 118 (act 284). This redirection may be direct to the web page hosting control 118, or alternatively may be indirect (e.g., passing through one or more intermediate web pages). Update root control 118 is executed at client 104 (or alternatively at server 102) and is passed a parameter by the new web page that specifies a uniform resource locator (URL) of a certificate trust list (act 286). The URL specified by the new web page is the location where a certificate trust list resides that includes the necessary root certificates to be added to root store 112 of client computer 104.

The update root control 118 then obtains (act 288) and verifies the integrity of (act 290) the certificate trust list. If the integrity of the certificate trust list cannot be verified, then the update process fails (act 292) and ends (act 294). However, if the integrity of the certificate trust list can be verified, then update root control 118 installs the new root certificates in root store 112 (act 296). Update root control 118 then redirects browser 110 (either directly or indirectly) to the web page originally requested in act 282 (act 298).

Although the process of FIG. 6 illustrates adding new root certificates, root certificates can be removed or modified in an analogous manner. For example, when a particular web page is accessed, a request may be sent by an additional control hosted on the web page for the usage restrictions of certain root certificates in root store 112. A check can then be made as to whether any of the usage restrictions on the root certificates should be changed, and the appropriate changes made. By way of another example, a request may be sent by an additional control hosted on the web page for whether a particular root certificate exists (or is still valid) in root store 112, and the root certificate removed if it is present (or still valid).

Alternatively, the web page that is initially attempted to be accessed by the user in act 282 may host the update root control. In such situations, the browser does not need re-directing to another web page, but rather is directed to the update root control on that web page. Similarly, the update root control may be resident on the client computer from which the access attempt in act 282 is received. In such situations, the browser does not need re-directing to another web page, but rather is directed to the resident update root control (alternatively, the update root control may reside on the client computer as a web page, resulting in the browser being directed to another web page, but a web page maintained by the client computer rather than a server).

By performing an automatic updating process as illustrated in FIG. 6, root certificates can be updated in a more user-friendly manner. The user need not actively search out new root certificates. Rather, when a web page is accessed that requires a new root certificate, the process of FIG. 6 automatically installs such a certificate in the root store of the user's computer.

CONCLUSION

Thus, updating trusted root certificates on a client computer has been described. A certificate trust list identifies root certificates and how to use them to update a root certificate store (e.g., addition, removal, or modification of root certificates). The certificate trust list is advantageously included in a cryptographically signed message, allowing the integrity of the certificate trust list to be verified by establishing a certificate chain from the signer's certificate to a root certificate in the root certificate store. Additionally, the update process can advantageously be automatically initiated when a web page is accessed by a client computer, with the client computer being automatically redirected to another web page hosting a control to update the root certificates at the client computer.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   accessing a certificate trust list;
   verifying the integrity of the certificate trust list by accessing a root certificate maintained in a root certificate store of a client computer; and
   modifying the root certificate store of the client computer in accordance with the certificate trust list if the integrity of the certificate trust list is verified.

2. A method as recited in claim 1, wherein the modifying comprises adding a root certificate in the certificate trust list to the root certificate store.

3. A method as recited in claim 1, wherein the modifying comprises removing a root certificate identified in the certificate trust list from the root certificate store.

4. A method as recited in claim 1, wherein the modifying comprises:
   identifying, from the certificate trust list, a root certificate in the root certificate store; and
   altering usage restrictions of the root certificate based on attributes in the certificate trust list.

5. A method as recited in claim 1, further comprising:
   receiving a uniform resource locator identifying where the certificate trust list is located; and
   wherein the accessing comprises obtaining the certificate trust list from the location identified by the uniform resource locator.

6. A method as recited in claim 1, further comprising:
   directing a web browser to a web page after modifying the root certificate store.

7. A method as recited in claim 1, wherein the verifying comprises:
   establishing a certificate chain from a sewer certificate corresponding to a cryptographically signed message that includes the certificate trust list, to the root certificate maintained in the root store.

8. A system comprising:
   means for accessing a certificate trust list;
   means for verifying the integrity of the certificate trust list by accessing a root certificate maintained in a root certificate store of a client computer; and
   means for modifying the root certificate store of the client computer in accordance with the certificate trust list if the integrity of the certificate trust list is verified.

9. A system as recited in claim 8, wherein the means for modifying comprises means for adding a root certificate in the certificate trust list to the root certificate store.

10. A system as recited in claim 8, wherein the means for modifying comprises means for removing a root certificate identified in the certificate trust list from the root certificate store.

11. A system as recited in claim 8, wherein the means for modifying comprises:
    means for identifying, from the certificate trust list a root certificate in the root certificate store; and
    means for altering usage restrictions of the root certificate based on attributes in the certificate trust list.

12. A system as recited in claim 8, further comprising:
means for receiving a uniform resource locator identifying where the certificate trust list is located; and
wherein the means for accessing comprises means for obtaining the certificate trust list from the location identified by the uniform resource locator.

13. A system as recited in claim 8, further comprising:
means for directing a web browser to a web page after modifying the root certificate store.

14. A system as recited in claim 8, wherein the means for verifying comprises:
means for establishing a certificate chain from a server certificate corresponding to a cryptographically signed message that includes the certificate trust list, to the root certificate maintained in the root store.

15. A system comprising:
means for verifying the integrity of a certificate trust list identifying one or more root certificates;
means for extracting a hash value from the certificate trust list corresponding to one of the identified root certificates;
means for accessing attributes corresponding to the hash value; and
means for updating a root certificate store on a client computer based on the accessed attributes.

16. A system as recited in claim 15, wherein the means for verifying comprises means for establishing a certificate chain from a signer certificate corresponding to the certificate trust list, to a root certificate in the root certificate store.

17. A system as recited in claim 15, further comprising means for not performing the extracting, accessing, or updating if the integrity of the certificate trust list is not verified.

18. A system as recited in claim 15, further comprising means for verifying the hash value before performing the accessing or updating.

19. A system as recited in claim 15, further comprising means for repeating the extracting, accessing, and updating for each of the one or more root certificates in the certificate trust list.

20. A system as recited in claim 15, wherein the means for updating comprises means for adding a root certificate, corresponding to the hash value, in the certificate trust list to the root certificate store.

21. A system as recited in claim 15, wherein the means for updating comprises means for removing a root certificate corresponding to the hash value from the root certificate store.

22. A system as recited in claim 15, wherein the means for updating comprises means for altering usage restrictions for a root certificate, corresponding to the hash value, based on the accessed attributes corresponding to the hash value.

23. A system as recited in claim 15, wherein each of the means for verifying, the means for extracting, the means for accessing, and the means for updating comprises computer-executable instructions.

24. A method comprising:
receiving, at a server computer, a request from a client computer to access a web page;
determining that the client computer does not have a necessary root certificate to access the web page; and
redirecting the client computer to another web page that hosts a control to add the necessary root certificate to the client computer.

25. A method as recited in claim 24, wherein the receiving comprises receiving a request to access the web page via a secure connection.

26. A method as recited in claim 24, further comprising receiving, after the necessary root certificate is added to the client computer, a subsequent request for the client computer to access the web page.

27. A method as recited in claim 26, wherein the receiving the subsequent request comprises receiving the subsequent request from the other web page.

28. A system comprising:
means for receiving, at a server computer, a request from a client computer to access a web page;
means for determining that the client computer does not have a necessary root certificate to access the web page; and
means for redirecting the client computer to another web page that hosts a control to add the necessary root certificate to the client computer.

29. A system as recited in claim 28, wherein the means for receiving comprises means for receiving a request to access the web page via a secure connection.

30. A system as recited in claim 28, further comprising means for receiving, after the necessary root certificate is added to the client computer, a subsequent request for the client computer to access the web page.

31. A system as recited in claim 30, wherein the means for receiving the subsequent request comprises receiving the subsequent request from the other web page.

32. A system comprising:
means for receiving, at a server computer, a request from a client computer to access a web page;
means for determining that a root certificate store at the client computer should be updated; and
means for redirecting the client computer to another web page that hosts a control to update the root certificate store at the client computer.

33. A system as recited in claim 32, wherein the means for receiving comprises means for receiving the request from a web browser executing at the client computer.

34. A system as recited in claim 32, further comprising means for receiving, after the root certificate store is updated, a subsequent request for the client computer to access the web page.

35. A system as recited in claim 34, wherein the means for receiving the subsequent request comprises means for receiving the subsequent request from the other web page.

36. A system as recited in claim 32, further comprising means for updating the root certificate store by doing one or more of: adding a new root certificate to the root certificate store, removing a root certificate from the root certificate store, and modifying usage restrictions of a root certificate in the root certificate store.

37. A system as recited in claim 32, wherein each of the means for receiving, the means for determining, and the means for redirecting comprises computer-executable instructions.

* * * * *